Nov. 5, 1946.   J. H. WEBB   2,410,616
APPARATUS FOR MOLDING LENSES
Filed Sept. 4, 1943   2 Sheets-Sheet 1
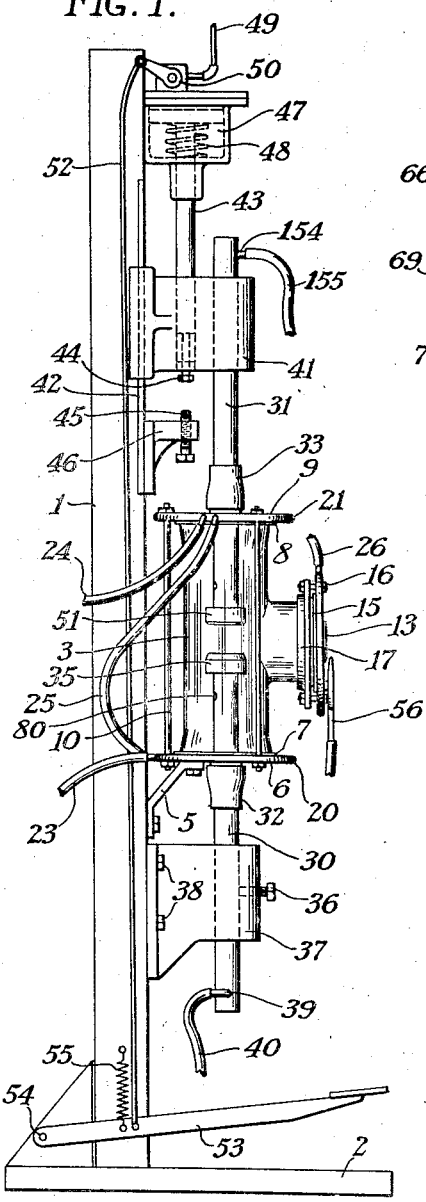
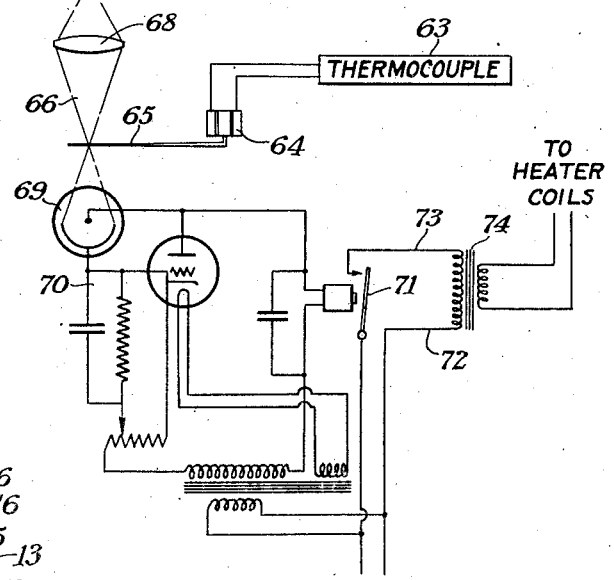
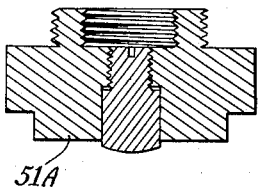
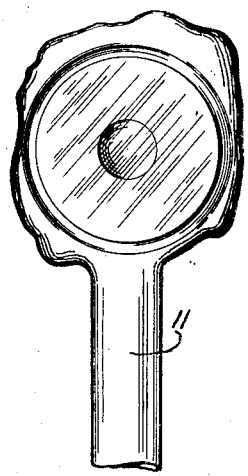
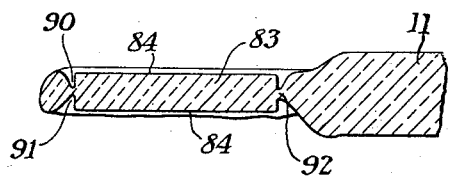
JULIAN H. WEBB
INVENTOR
BY
ATTORNEYS Nov. 5, 1946.  J. H. WEBB  2,410,616
APPARATUS FOR MOLDING LENSES
Filed Sept. 4, 1943 2 Sheets-Sheet 2

JULIAN H. WEBB
INVENTOR
BY
ATTORNEYS

Patented Nov. 5, 1946

2,410,616

UNITED STATES PATENT OFFICE 2,410,616

APPARATUS FOR MOLDING LENSES

Julian H. Webb, Rochester, N. Y., assignor to Eastman Kodak Company, Rochester, N. Y., a corporation of New Jersey Application September 4, 1943, Serial No. 501,226

8 Claims. (Cl. 49—35)

This invention relates to apparatus for producing molded lenses. An object of my invention is to provide a molding machine which is comparatively simple to operate and one in which the mold members may be protected against oxidation. Another object of my invention is to provide a lens molding machine in which the mold members may be brought together to form a lens element on the end of a piece of material to be molded in such a manner that the material may be withdrawn with the completely formed lens thereon. Another object of my invention is to provide a molding machine in which the molds and the plastic to be molded are used at comparatively high temperatures and to provide a mechanism which will automatically maintain the molds at substantially the desired temperature. Still another object of my invention is to provide a machine in which, particularly while the molds are heated, the molds will be protected against oxidation. A still further object of my invention is to provide a machine in which the molding operations can be performed in the full view of the operator and at the same time in which oxidizing gases may be excluded from the mold members. Other objects will appear from the following specification, the novel features being particularly pointed out in the claims at the end thereof.

Coming now to the drawings in which like reference characters denote like parts throughout:

Fig. 1 is a side elevation of a lens molding machine illustrating a preferred embodiment of my invention and being suitable for carrying out my improved method of molding;

Fig. 2 is a diagram showing the automatic heat control apparatus;

Figs. 3 and 4 are cross-sectional views of a cooperating pair of mold members removed from the machine;

Fig. 5 is a fragmentary top plan view of a molded lens on the end of a bar of moldable material after the optical surfaces have been formed between the mold members shown in Figs. 3 and 4;

Fig. 6 is a cross-sectional view through a plastic flat which has been formed on the end of a glass rod by mold members differing from those shown in Figs. 3 and 4;

There have been many machines constructed for molding relatively rough glass articles which do not require surfaces having a high degree of accuracy, such as is commonly referred to as a "spectacle finish." A spectacle finish as the name implies is one which is of such a high degree of accuracy that it resembles and closely approaches the finish of spectacles which are, so far as applicant is aware, always finished by grinding and polishing operations.

Some of the known lens molding machines have been able to produce comparatively good optical surfaces, such as the surfaces used on roadside buttons and some other types of lenses such as finder lenses for inexpensive cameras and, while the surfaces of these lenses have been relatively good for the purposes for which they are used, the finish has nevertheless, so far as applicant has been aware, not been good enough for extremely accurate work.

It is an object of the present invention to provide an exceedingly accurate optical surface by molding and by carrying out my method of molding to be able to maintain a mold surface of a sufficiently accurate shape and curvature in spite of the relatively high temperatures that these molds are subjected to.

My invention may be briefly described as a machine in which the mold members may be enclosed and from which enclosure air may be excluded both during portions of the heating operations and all of the molding operations so that there is little if any tendency for the molds to become oxidized or for the surfaces of the molds to be marred or damaged in any way. By carrying out my improved method and molding the plastic material in an inert or reducing atmosphere so that the molds will not become oxidized, the life of the molds may not only be greatly increased but the accuracy of form and surface can be maintained for a useful life for the molds. Most of the oxidation of molds used without excluded air occurs while the molds are heated at a relatively high temperature, and I have found that if the molds are adequately protected against air or other oxidizing gases when the molds are raised materially above room temperature, the accurately formed molding surfaces can be retained for considerable time.

Figure 7:
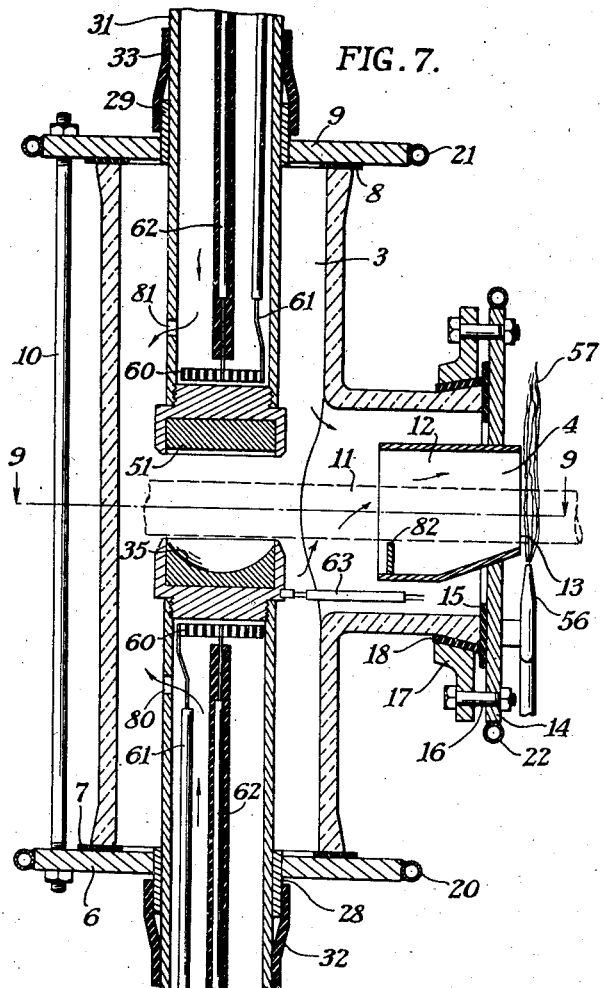
Fig. 7 is an enlarged sectional view through the enclosed molding chamber of the machine shown in Fig. 1 and taken on line 7—7 of Fig. 8.

More specifically a preferred embodiment of my machine may consist of a support 1 extending upwardly from a base 2 and carrying an enclosed molding chamber 3. This chamber can be conveniently mounted in such a manner that an opening 4 of the enclosure is at the desired height for the operation of the molding machine. The molding chamber 3 as best shown in Fig. 7 is roughly T-shaped and is preferably made of Pyrex glass. It is mounted on the support 1 by means of suitable brackets 5 which support a bottom plate 6 and a gasket 7 on which the bottom of the molding chamber rests. A similar gasket 8 at the top supports the top plate 9 and these plates may be held toward each other to clamp the molding chamber 3 in place by means of suitable bolts 10.

The opening 4 in the chamber 3 is for the introduction and removal of a stick or bar of plastic 11 to be molded and the opening 4 may be formed of a tubular member 12 having a comparatively small opening 13 on the exterior of the molding chamber 3 and being held in place by an end plate 14 resting on a gasket 15 and held by bolts 16 passing through the beveled annular flange 17. A gasket 18 lies between the annular plate 17 and the molding chamber to prevent it from breaking.

Since the end plates 6, 9 and 14 would normally become extremely hot in the operation of my machine, I prefer to provide pipes 20, 21 and 22 extending around the peripheries of these plates so that water may be circulated through these pipes from the supply tubes 23, 24, 25 and 26, all as shown in Fig. 1. It is not important what medium is circulated through these cooling tubes but I have found it necessary to cool the end plates in order to prevent the heat from damaging the gaskets 7 and 8. The chamber 3 can then be maintained in a substantially gas-tight condition except for the opening 4.

The end plates 6 and 9 are provided with bearings 28 and 29 through which the tubular members 30 and 31 may pass. Similar gaskets 32 and 33 form gas tight joints between the bearings 28 and 29 and the tubular members 30 and 31 which can slide inside of the bearings and gaskets in setting up and in operating my machine.

In the present embodiment of my invention the tubular member 30 carries a mold member 35 which is shown as the lower mold member and the tube 30 is normally held in a fixed position by means of the setscrew 36 and the bracket 37 which may be attached by screws 38 to the support 1.

The bottom of the tubular member 30 is plugged up and there is an entrance pipe 39 connected to a tube 40 so that an inert or reducing gas may be passed into the closed chamber 3 as will be hereinafter more fully described.

The upper tubular member 31 is like the lower except that it is carried by a slide 41 which may move on an accurately formed track 42 on the support 1 when a piston 43 moves. The position of the slide 41 relatively to the piston 43 may be adjusted as by means of a screw 44 and this screw may form a stop for limiting the movement of the slide 41 by striking a screw 45 carried by the bracket 46.

The piston 43 extends into a cylinder 47 and is normally held upwardly therein by means of a spring 48. However, when air is admitted to the cylinder through the compressed air pipe 49 and the valve 50, the plunger 43 will move downwardly carrying an upper die member 51 downwardly and into an operative position with respect to the lower die member 35. The valve member 50 can conveniently be operated by the rod 52 extending upwardly from a foot treadle 53 pivoted at 54 to the base and normally raised by a spring 55. Thus, in order to operate the machine the foot treadle 53 is depressed and the dies are brought into operative relationship to mold a lens such as shown in Fig. 5 from a lower mold member 35 and an upper die member 51A both as shown in Figs. 3 and 4.

Like the lower tubular member 30 the upper tubular member 31 is also plugged and there is an entrance pipe 154 attached to a supply tube 155 leading to a source of inert or reducing gas. There are quite a number of gases which may be employed since in general any gas which will prevent oxidizing of the mold members can be used. Hydrogen has been found entirely satisfactory for my purpose, although I have found that it is necessary to sometimes purify the hydrogen which can be bought commercially because I have found that such hydrogen sometimes contains small quantities of air. However, by circulating hydrogen through the pipes 40 and 155 as the die members 51 and 35 are heated; the air in the molding chamber 3 is completely driven out. The hydrogen is burned as it issues from opening 13 and by providing an air jet 56 across the bottom of the opening 13 (best shown in Figs. 7 and 8) I can provide a curtain of flame 57 across the opening 13 which will effectually prevent any air from entering the molding chamber 3 and which will at the same time permit the material to be molded to be freely passed into and out of the chamber. If gases other than hydrogen are to be used, it may be desirable to use illuminating or other gas in the jet.

While I prefer to use hydrogen, helium, nitrogen and other gases would also be suitable, but since hydrogen can readily be obtained it is one of the easiest gases to use.

My machine is primarily designed for molding accurate lens surfaces in glass which has been rendered plastic by heating. Since the point at which various different glasses become suitably plastic for molding varies quite widely with different glasses, the temperatures to which the dies should be raised will also vary, but I have found it desirable to mold certain types of glass with the molds between 500 and 600° C. It is of course desirable to maintain the molds at the best temperature for molding the particular glass being used and for this reason I have provided an automatic heat control which will readily maintain the molds from within 5 to 8° C. during intermittent operation. Thus the molds which would heat up rapidly in contact with the heated plastic glass are not heated during their contact with the glass because the heating elements are automatically turned off when the temperature rises to a predetermined amount.

Referring to Fig. 7, it will be noticed that both of the tubular members 30 and 31 carrying the lower mold 35 and the upper mold 51 are provided with a similar type automatic heating unit which, in this instance, consists of a coil of Nichrome ribbon 60 connected by wires 61 and 62 to a source of heating current, these wires passing out of the tubular members 30 through suitable insulators. A thermocouple 63 may be attached to one or both of the molds, but I have found that by attaching it to the lower mold (as shown in Fig. 7) the desired results can be accomplished.

Referring to Fig. 2, the thermocouple 63 may be attached to a galvanometer 64 so that a vane 65 may be made to pass through a light beam 66 from a lamp 67 which is focused by a lens 68 upon a light-sensitive cell 69. The parts are so adjusted that when the temperature of the mold 35 rises above the desired point the vane 65 moves out of the light beam and admits light to the photocell. The photocell, by means of the vacuum tube circuit 70, operates a relay 71, thus breaking the primary circuit through wires 72 and 73 of the transformer 74 so that the heating coils (of Nichrome ribbon 60) cool off. After the glass has been molded and removed from between the mold members, if the mold begins to cool, the reverse of the above-described control takes place, the circuit being made and the heating unit (of Nichrome ribbon 60) again bringing the molds up to molding temperature. After molding I have found that the current usually remains off for five to ten seconds after the hot glass is removed from the molds.

Figure 8:
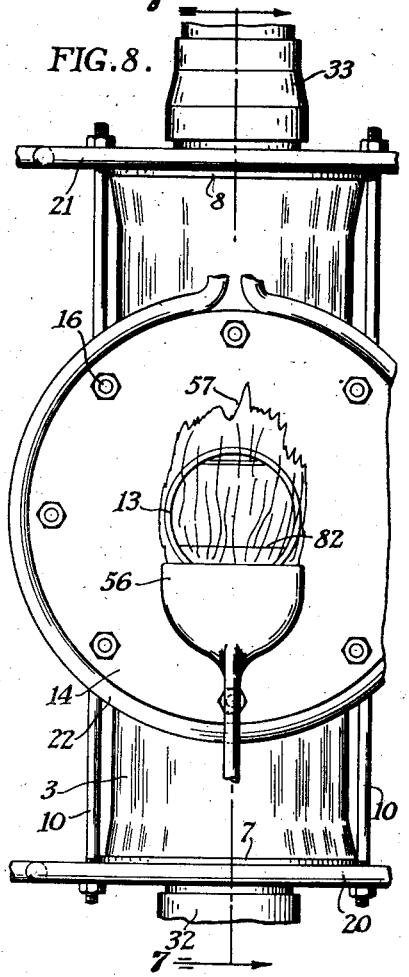
Fig. 8 is a front plan view of the molding chamber shown in Fig. 7.
Figure 9:
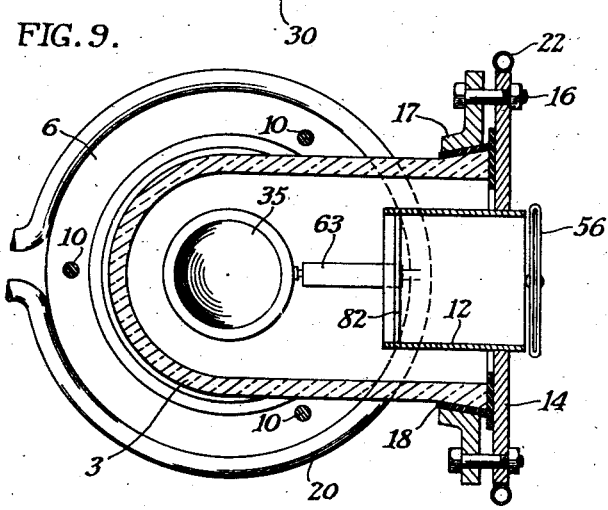
Fig. 9 is a section on line 9—9 of Fig. 7.

It should be noticed from Fig. 7 that during the heating of the molds and during the molding operations hydrogen can be admitted through the tubular members 30 and 31 passing from these tubular members through the openings 80 and 81 so as to flow through the chamber 3 and to drive air out of the chamber until the molds are in an atmosphere of pure hydrogen 82 is a baffle plate which prevents eddy currents in the hydrogen gas flowing through the tubular member 12. It can also be used to help position the glass bar 11. This atmosphere cannot be contaminated by outside air because of the flame curtain 57 which extends completely across the opening 13 because of the air jet 56 mounted across the lower edge of the opening 13 thereof as shown in Fig. 8. A glass rod 11 can readily be inserted through this flame wall while at the same time the flame prevents air from entering the chamber.

Figure 10:
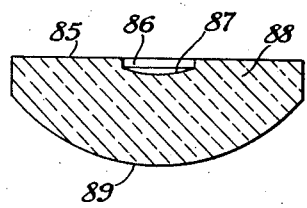
Fig. 10 is a sectional view through a typical molded lens which can be made with my improved machine and by my improved method.

Referring to Fig. 6, it is often desirable to provide circular blanks such as is shown at 83, these blanks having plane surfaces 84. The surfaces may be either wedge-shaped or flat so that in the application and claims where I refer to optical surfaces or lenses I desire by this term to include not only accurately curved spherical or aspherical walls, but also plane optical surfaces such as shown at 84 in Fig. 6 and at 85 in Fig. 10. In this figure there is a plane wall 85 having a cylindrical opening 86 in the center, the lower end of which carries a spherical surface 87. The opposite side of this lens 88 has a curved wall 89 and this entire lens, like the one shown in Fig. 5, can readily be molded on the end of a glass rod in the following manner.

After the mold members have been placed on their tubular supports 30 and 31, and the molding enclosure or chamber 3 has been evacuated of air by admitting hydrogen through the supply lines 40 and 155, the apparatus is ready for use as soon as the temperature of the molds is raised to the desired heat. After evacuating the chamber 3 of air the hydrogen issuing from the opening 13 can be lighted to provide the curtain of flame over the entrance 13 through which the heated glass rod 11 may be inserted so that the plastic glass may be molded by depressing the foot treadle 53 bringing the relatively movable mold into contact with the lower mold or into operative relationship therewith.

I might point out that, as shown in Fig. 6, I prefer to so position the mold members that the molded disk (in this instance) is incompletely separated from the rod 11 because it is desirable to remove the molded member through the flame curtain by means of the rod. I, therefore, shape the molds to leave one or more grooves, 90 and 91, about the edge of the molded element so that, after having removed the rod with the molded disk thereon, this disk can be later removed by breaking through the remaining extremely thin wall 92. In fact, it is necessary to take some care in the amount of wall 92 left holding the molded part on the rod because as the glass cools this wall will readily break through and in some instances it may break before the operator has completely removed the part from the enclosed chamber unless a sufficiently thick wall is left to retain the molded element on the rod.

It is obvious that the molds may be of any shape desired but they should of course be made of a material which will hold the highly polished finish which is desirable as long as possible. Such molds may be made of various materials and usually the highly finished surface when protected by an atmosphere of hydrogen, or other non-oxidizing gas inert toward the molds, will retain such a finish for some time. I have found for instance that certain materials may be oxidized in a very few minutes at high temperatures where the same materials can be repeatedly used over a long period of time without deterioration if an atmosphere of hydrogen is maintained about the molds when they are heated to a temperature well above room temperature.

While I have described my invention as applying particularly to the production of accurate "spectacle finish" surfaces on lenses of a quality which may be used for spectacles, if desired certain features of my improved machine may be equally useful for molding other plastic materials. Usually such plastics are molded at much lower temperatures than glass but otherwise my machine could readily be used for many types of molded materials adjusting the temperatures of the mold members for the particular material at hand. While I have described a preferred form of machine and a preferred method of carrying out my invention, it is obvious that various forms of the invention may be readily suggested which do not depart from the scope of my invention as defined in the following claims.

What I claim is:

1. In a glass molding machine, the combination with a base, of cooperating molds mounted thereon, at least one mold being movable to and from a position in which the molds define the shape of material to be molded, a chamber enclosing the molds and having an opening therein through which the material to be molded may be passed to and from the molds, and pipes leading to the chamber through which an inert gas may pass into the chamber, and a gas jet positioned to form, when ignited, a flame curtain over the opening in the chamber to prevent the entrance of air thereinto.

2. In a glass molding machine, the combination with a base, of cooperating molds mounted thereon, at least one mold being movable to and from a position in which the molds define the shape of material to be molded, a chamber enclosing the molds and having an opening therein through which the material to be molded may be passed to and from the molds, and pipes leading to the chamber through which an inert gas may pass, electric means for heating the molds in the chamber, a supply of inert gas connected to said pipes for surrounding the heated molds with an atmosphere of inert gas in said chamber, and means for providing a flame curtain over the opening in the chamber to prevent the entrance of air thereinto.

3. In a glass molding machine, the combination with a base, of cooperating molds mounted thereon, at least one being movable to and from a position in which the molds define the shape of material to be molded, a chamber enclosing the molds and having an opening therein through which the material to be molded may be passed to and from the molds, and pipes leading to the chamber through which an inert gas may pass, electric means for heating the molds in the chamber, a supply of inert gas connected to said pipes for surrounding the heated molds with an atmosphere of inert gas in said chamber, and a gas burner adjacent said opening in the chamber and adapted, when ignited, to furnish a flame curtain completely covering said opening.

4. In a glass molding machine, the combination with a base, of a pair of molds mounted thereon, a movable mount for at least one mold for moving one mold relative to the other, a chamber enclosing the molds and having an opening therein for the admission of material to be molded to the molds, means for supplying an atmosphere of an inert gas to the chamber to drive air from the molds the excess inert gas passing out through the opening, and means for providing a flame curtain over said opening to prevent the entrance of air thereinto.

5. In a glass molding machine, the combination with a base, of a pair of molds mounted thereon, a movable mount for at least one mold for moving one mold relative to the other, a chamber enclosing the molds and having an opening therein for the admission of material to be molded to the molds, means for supplying an atmosphere of an inert gas to the chamber to drive air from the molds, the excess inert gas passing out through the opening, a gas jet adjacent the bottom of the opening and having a wide nozzle extending substantially across the opening whereby the gas may, when ignited, form a flame curtain extending completely over the opening and excluding air therefrom.

6. In a glass molding machine, the combination with a base, of a pair of molds mounted thereon, a movable mount for at least one mold for moving one mold relative to the other, a chamber enclosing the molds and having an opening therein for the admission of material to be molded to the molds, means for supplying an atmosphere of an inert gas to the chamber to drive air from the molds, the excess inert gas passing out through the opening, a gas jet adjacent the bottom of the opening and having a wide nozzle extending substantially across the opening whereby the gas may, when ignited, form a flame curtain extending completely over the opening and excluding air therefrom, electrical means for heating the molds in the chamber, a temperature controlled circuit connected to the electrical heating means for making and breaking the heating circuit to control the temperature of the molds, said inert gas surrounding said molds preventing oxidizing of the molds while heated.

7. In a glass molding machine, the combination with a base, of a pair of molds having highly finished molding surfaces mounted thereon in axial alignment, a cylinder, a piston therein, a spring normally holding the piston in one position, a valve for admitting an operating fluid to the cylinder to move the piston to a second position, the piston carrying one of the molds to move said mold to and from the other mold, a chamber about the molds having an opening therein, a source of hydrogen, connections between said source and said chamber for circulating hydrogen about the molds, an air jet adjacent the opening having a wide and narrow nozzle to provide with the hydrogen, when ignited, a flame curtain over the opening through which a heated glass rod may be passed to position plastic glass between the molds for forming an optical element thereon.

8. In a glass molding machine, the combination with a base, of a pair of molds having highly finished molding surfaces mounted thereon in axial alignment, a cylinder, a piston therein, a spring normally holding the piston in one position, a valve for admitting an operating fluid to the cylinder to move the piston to a second position, the piston carrying one of the molds to move said mold to and from the other mold, a chamber about the molds having an opening therein, a source of hydrogen, connections between said source and said chamber for circulating hydrogen about the molds, an air jet adjacent the opening having a wide and narrow nozzle to provide with the hydrogen, when ignited, a flame curtain over the opening through which a heated glass rod may be passed to position plastic glass between the molds for forming an optical element thereon, an automatic heater carried by each mold for heating the molds while in the atmosphere of hydrogen, whereby the heated, highly finished molding surfaces of the molds may be protected against oxidation while in a condition to mold plastic glass.

JULIAN H. WEBB.